United States Patent
Amini et al.

(10) Patent No.: US 9,888,523 B2
(45) Date of Patent: Feb. 6, 2018

(54) MULTI RADIO WIRELESS LAN NETWORKS

(71) Applicant: NETGEAR, Inc., San Jose, CA (US)

(72) Inventors: Peiman Amini, Mountain View, CA (US); Joseph Amalan Arul Emmanuel, Cupertino, CA (US); Shun-Liang Yu, Milpitas, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 15/091,542

(22) Filed: Apr. 5, 2016

(65) Prior Publication Data

US 2016/0227604 A1 Aug. 4, 2016

Related U.S. Application Data

(62) Division of application No. 14/105,077, filed on Dec. 12, 2013, now Pat. No. 9,351,338.

(60) Provisional application No. 61/904,372, filed on Nov. 14, 2013.

(51) Int. Cl.
*H04W 4/00* (2009.01)
*H04W 88/08* (2009.01)
*H04B 1/00* (2006.01)

(52) U.S. Cl.
CPC .......... *H04W 88/08* (2013.01); *H04B 1/0057* (2013.01)

(58) Field of Classification Search
USPC ................................................. 370/329, 338
See application file for complete search history.

(56) References Cited

U.S. PATENT DOCUMENTS

| 6,961,596 | B2 | 11/2005 | Van Erven et al. |
| 7,643,848 | B2 | 1/2010 | Robinett et al. |
| 2005/0025220 | A1* | 2/2005 | Laroia ............. H04L 5/06 375/132 |
| 2005/0096084 | A1 | 5/2005 | Pohja et al. |
| 2008/0181151 | A1 | 7/2008 | Feher et al. |
| 2008/0279138 | A1 | 11/2008 | Gonikberg et al. |
| 2009/0318087 | A1 | 12/2009 | Mattila et al. |
| 2010/0008339 | A1 | 1/2010 | Huang et al. |
| 2011/0189997 | A1 | 8/2011 | Tiwari et al. |
| 2011/0300805 | A1 | 12/2011 | Gaikwad et al. |

(Continued)

FOREIGN PATENT DOCUMENTS

CN 101741803 A 6/2010

OTHER PUBLICATIONS

"PowerBridge M5: Carrier Class 5GHz MIMO Bridging Solution datasheet", http://dl.ubnt.com/pbm5_datasheet.pdf [retrieved Feb. 6, 2014], 1 page.

(Continued)

*Primary Examiner* — Phuongchau Ba Nguyen
(74) *Attorney, Agent, or Firm* — Perkins Coie LLP

(57) ABSTRACT

Systems and methods for improving wireless access point communications are provided. Some embodiments contemplate filtering operations such that two or more radios can be used in the 5 GHz or 2.4 GHz band without interfering with each other. Some embodiments employ discrete Low Noise Amplifiers (LNA) and Power Amplifiers (PA) as well as frontend modules. In some examples, filtering may be primarily used on the receiving side to filter out other signals in 5 GHz before they are amplified by an external LNA or LNAs, e.g., as integrated in a WLAN chipset. Filtering may also be performed on the transmit side in some embodiments.

16 Claims, 18 Drawing Sheets

(56) References Cited

U.S. PATENT DOCUMENTS

| | | |
|---|---|---|
| 2012/0280754 A1 | 11/2012 | Gorbachov et al. |
| 2013/0043946 A1 | 2/2013 | Hadjichristos et al. |
| 2013/0122956 A1 | 5/2013 | Lee et al. |
| 2013/0136117 A1 | 5/2013 | Schrum, Jr. et al. |
| 2015/0036514 A1 | 2/2015 | Zhu et al. |
| 2015/0105121 A1 | 4/2015 | Emmanuel et al. |

OTHER PUBLICATIONS

"Rocket M, Ubiquit Networks, Inc.," http://dl.ubnt.com/datasheets/rocketmgps/Rocket_M_GPS_Datasheet.pdf [retrieved Feb. 6, 2014], 10 pages.

"Ubiquiti Loco NanoStation Airmax", http://www.amazon.com/Ubiquiti-Loco-NanoStation-900MHz-Airmax/dp/B004FRVKC6 [retrieved Jan. 16, 2014], 4 pages.

"Ubiquiti Networks RocketM Titanium Datasheet", http://dl.ubnt.com/datasheets/rocketmgps/RocketM_Ti_DS.pdf [retrieved Feb. 6, 2014], 8 pages.

"Ubiquiti Networks, Inc., airMax General Newsletter", Ubiquiti Networks, Inc., airMax General Newsletter, San Jose, CA, vol. 1 No. 23, Aug. 3, 2010, http://dl.ubnt.com/newsletters/0123a.html [retrieved Jan. 16, 2014]., 3 pages.

"Ubiquiti Networks, Inc., AirMax NanoBridge M,", http://www.ubnt.com/airmax#nanobridgem [retrieved Feb. 6, 2014], 2 pages.

"Ubiquiti Networks, Inc., AirMax Rocket M,", http://www.ubnt.com/airmax#airMaxHardware [retrieved Feb. 6, 2014], 2 pages.

"Ubiquiti Networks, Inc., airMAX, PowerBridge M", http://www.ubnt.com/airmax#powerbridge [retrieved Feb. 6, 2014], 2 pages.

"Ubiquiti Networks, Inc., NanoBridge M, High-Performance airMAX® Bridge, datasheet,", http://dl.ubnt.com/datasheets/nanobridgem/nbm_ds_web.pdf [retrieved Feb. 6, 2014], pp. 1-11.

"Ubiquiti Networks, Inc., NanoStation M, MIMO TDMA Protocol System,", http://www.ubnt.com/airmax#nanostationm [retrieved Feb. 6, 2014], 2 pages.

"Ubiquiti Networks, Inc., NanoStation M, NanoStation locoM, datasheet,", http://dl.ubnt.com/datasheets/nanostationm/nsm_ds_web.pdf [retrieved Feb. 6, 2014], pp. 1-12.

"Ubiquiti Networks, Inc., PowerBridge M10, 10 GHz Carrier Class airMAX PtP Bridge with Dish Antenna", http://dl.ubnt.com/datasheets/powerbridgem/PowerBridge_M10_datasheet.pdf [retrieved Feb. 6, 2014], pp. 1-6.

"Ubiquiti Networks, Inc., PowerBridge M3: Carrier Class Licensed 3.5GHz AirMax Bridge datasheet", http://dl.ubnt.com/datasheets/powerbridgem/pbm3_datasheet.pdf [retrieved Feb. 6, 2014], 1 page.

"Ubiquiti Networks, Inc., Rocket M, Quick Start Guide", http://dl.ubnt.com/guides/Rocket_M/RocketM_Series_QSG.pdf [retrieved Feb. 6, 2014], 24 pages.

\* cited by examiner

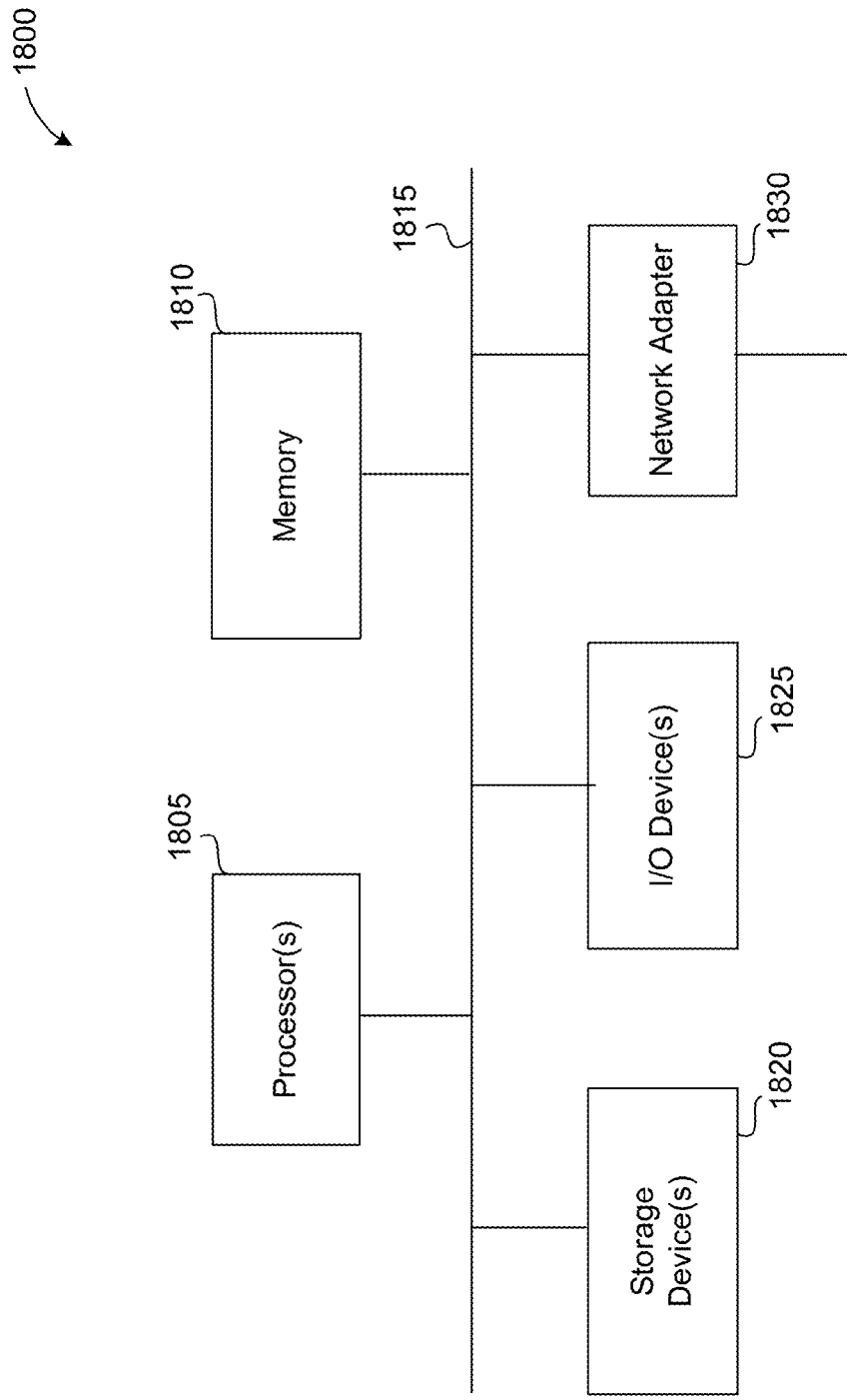

MULTI RADIO WIRELESS LAN NETWORKS

CROSS REFERENCE TO RELATED APPLICATIONS

This application is a divisional of U.S. patent application Ser. No. 14/105,077, entitled "MULTI RADIO WIRELESS LAN NETWORKS", filed Dec. 12, 2013, which is entitled to the benefit of and the right of priority to U.S. Provisional Patent Application No. 61/904,372, entitled "MULTI RADIO WIRELESS LAN NETWORKS", filed Nov. 14, 2013, both of which are hereby incorporated by reference in their entirety for all purposes.

TECHNICAL FIELD

The disclosed embodiments relate to coexisting usage of radios in a 5 GHz communications band and, in some embodiments, in a 2.4 GHz band.

BACKGROUND

Network bandwidth in local networks, e.g., WLAN networks, is increasingly scarce. New user devices increasingly rely upon network connections and many new devices that did not previously impose such requirements now seek network resources. Some home appliances, e.g., that traditionally did not require a network connection now come with network functionality. Access points and routers originally designed for providing communications access on 2.4 and 5 GHz bands may not be able to handle this increased demand. Accordingly, there exists a need for communications systems compatible with existing devices, but which increase the bandwidth for communication.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 18 is a block diagram of a computer system as may be used to implement features of some of the embodiments.

Figure 1:
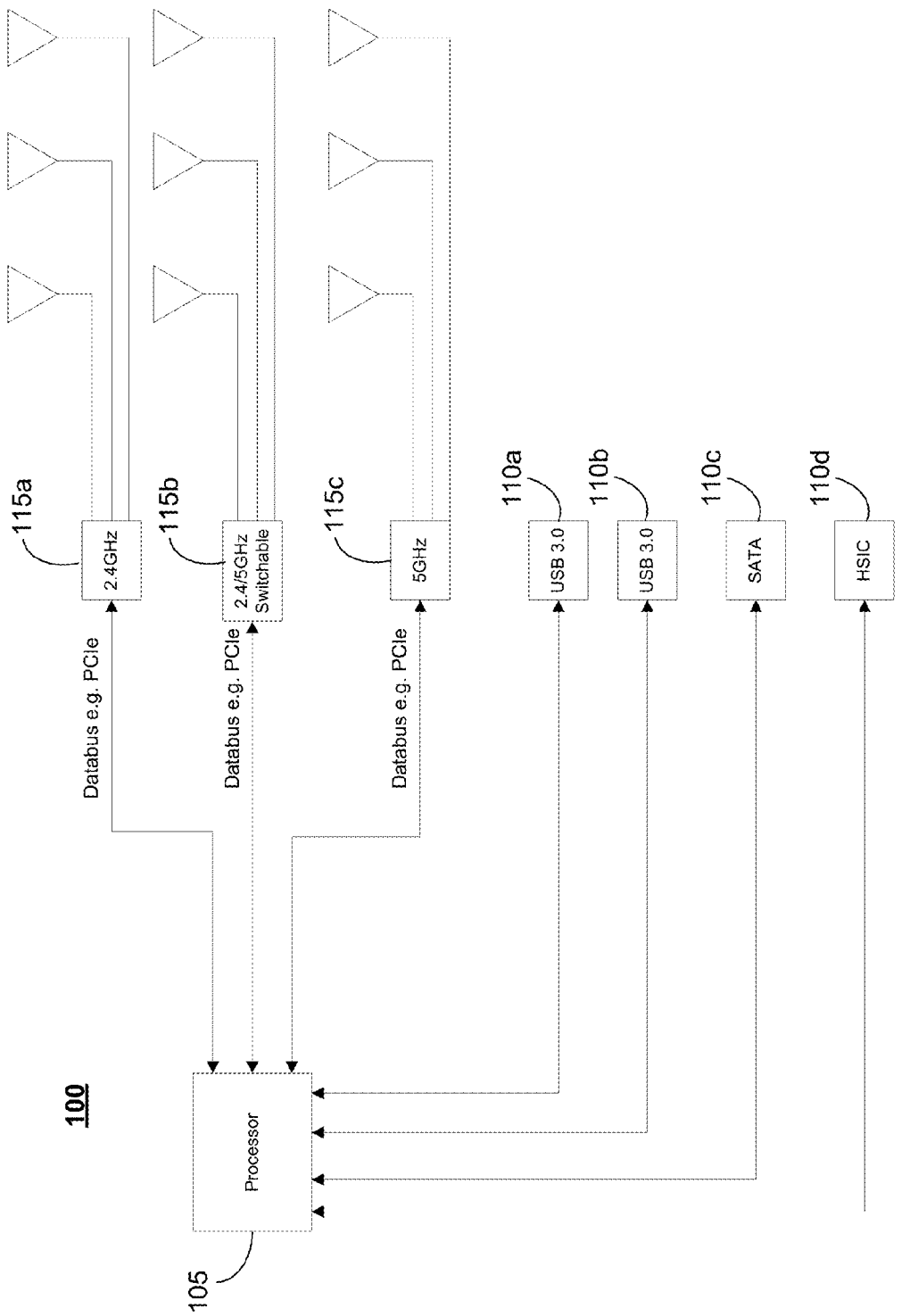
FIG. 1 is an example system layout (e.g., for an access point, laptop peripheral, router, etc.) as may occur in some embodiments.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Overview

Various of the disclosed embodiments relate to systems and methods for improving wireless access point communications. Some embodiments contemplate filtering operations such that two or more radios can be used in the 5 GHz region without interfering with each other. Some embodiments employ discrete Low Noise Amplifiers (LNA) and Power Amplifiers (PA) as well as frontend modules to efficiently separate communications between the subchannels within the 5 GHZ region. In some examples, filtering may be primarily used on the receiving side to filter out other signals in 5 GHz before they are amplified by an external LNA or LNAs, e.g., as integrated in a WLAN chipset. Filtering may also be performed on the transmit side in some embodiments (e.g., to prevent incidental interference with a neighboring subchannel). In some embodiments, a combination of filtering may be done on both the transmitting and receiving sides. In some embodiments two or more of the RF components may be integrated into one or more chipsets.

For example, the LNA, PA and RF switches depicted in the figures below may be integrated into one or more components.

General Description

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Example Overview

FIG. 1 is an example access point layout 100 as may occur in some embodiments. In this example, a 2.4 GHz radio 115a, a 2.4/5 GHz switchable radio 115b, and a 5 GHz radio 115c may coexist on a single system. A processor 105 may be in communication with the radios 115a-c and a plurality of peripheral systems 110a-c, including, e.g., USB 110a-b, SATA 110c, and HSIC 110d. The processor 105 may also be in communication with several communication modules 115a-c for 2.4 GHz 115a and 5 GHz 115c communication. Some modules 115b may be switchable between 2.4 GHz and 5 GHz. Though the depicted embodiment illustrates on of each radio type any combination of radio types is envisioned. Each of the communication modules 115a-c may contain two or more antennas. Filtering performed at the processor and/or at the communication modules may facilitate reception and/or transmission on each antenna of the communication modules.

Various embodiments contemplate subdividing the 5 GHz region into two or more subchannels. In some embodiments, a similar subdivision is performed in the 2.4 GHz allocation. Communication may then be performed within these regions to improve bandwidth. In some embodiments, backwards compatibility with devices unaware of the subdivisions may be accomplished by reallocating communications among the subchannels to accommodate a region used by the predecessor device.

Geographic Filtering Options

FIGS. 2-8 depict the filter cut off options in various geographic regions that may be used in the 5 Ghz region to protect two radios operating on different subchannels within the 5 GHz region from each other. Each of these figures depicts subdivisions of the 5 GHz region (referred to herein as "subchannels" or "bands") in the respective geographic market to accommodate more granular use of the bandwidth.

Figure 2:
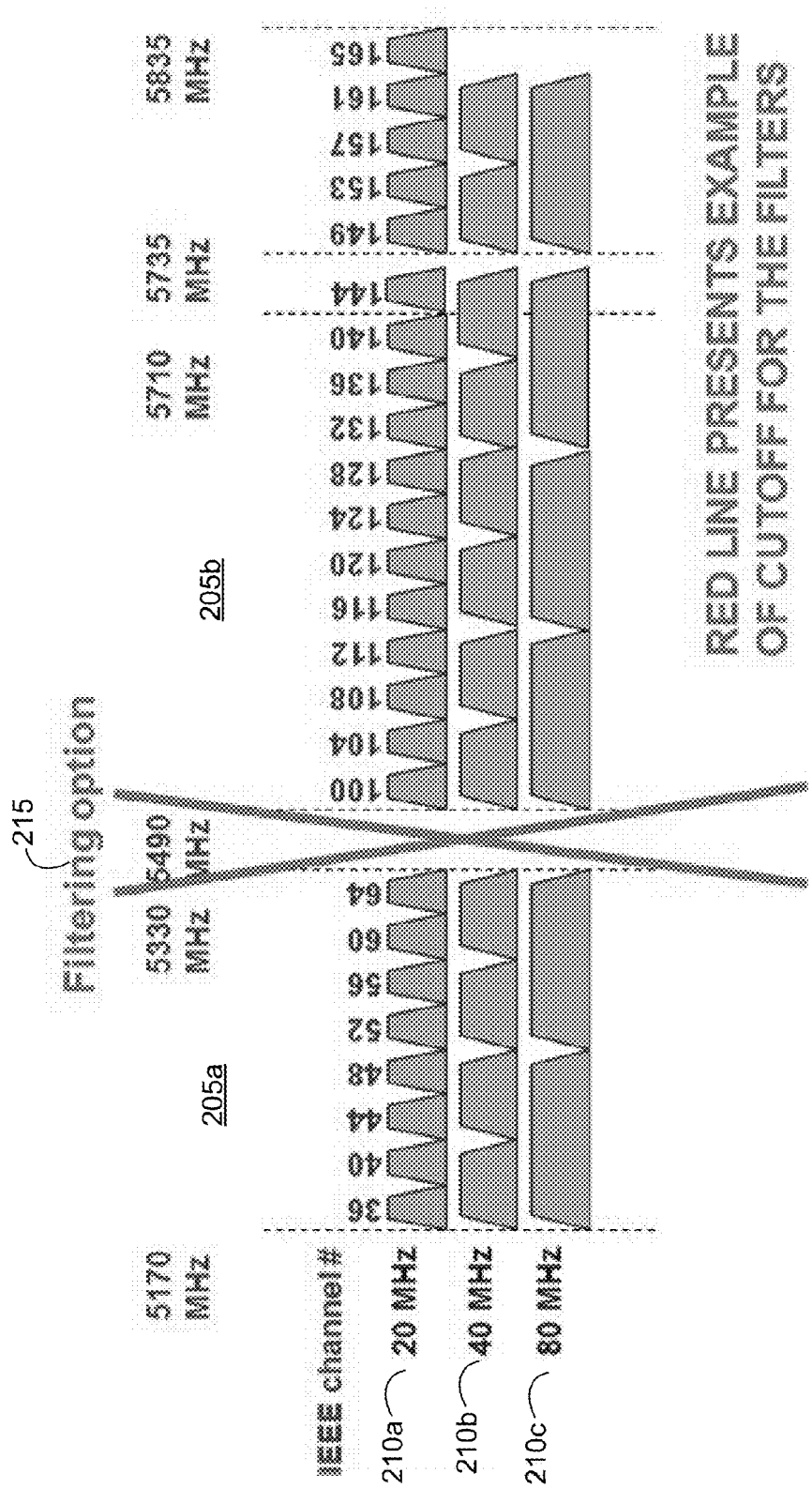
FIG. 2 depicts the filtering options available in the WLAN 5 GHz FCC allocation in the United States as may occur in some embodiments.

FIG. 2 depicts the filtering options available in the WLAN 5 GHz FCC allocation in the United States as may occur in some embodiments. The lines 215 present an example cutoff for the filters between the regions 205a and 205b. Additional center frequencies (indicated by trapezoids) may be available within each region 205a and 205b depending upon the channel bandwidth frequency 210a-c used at, e.g., an 802.11 Access Point.

Figure 3:
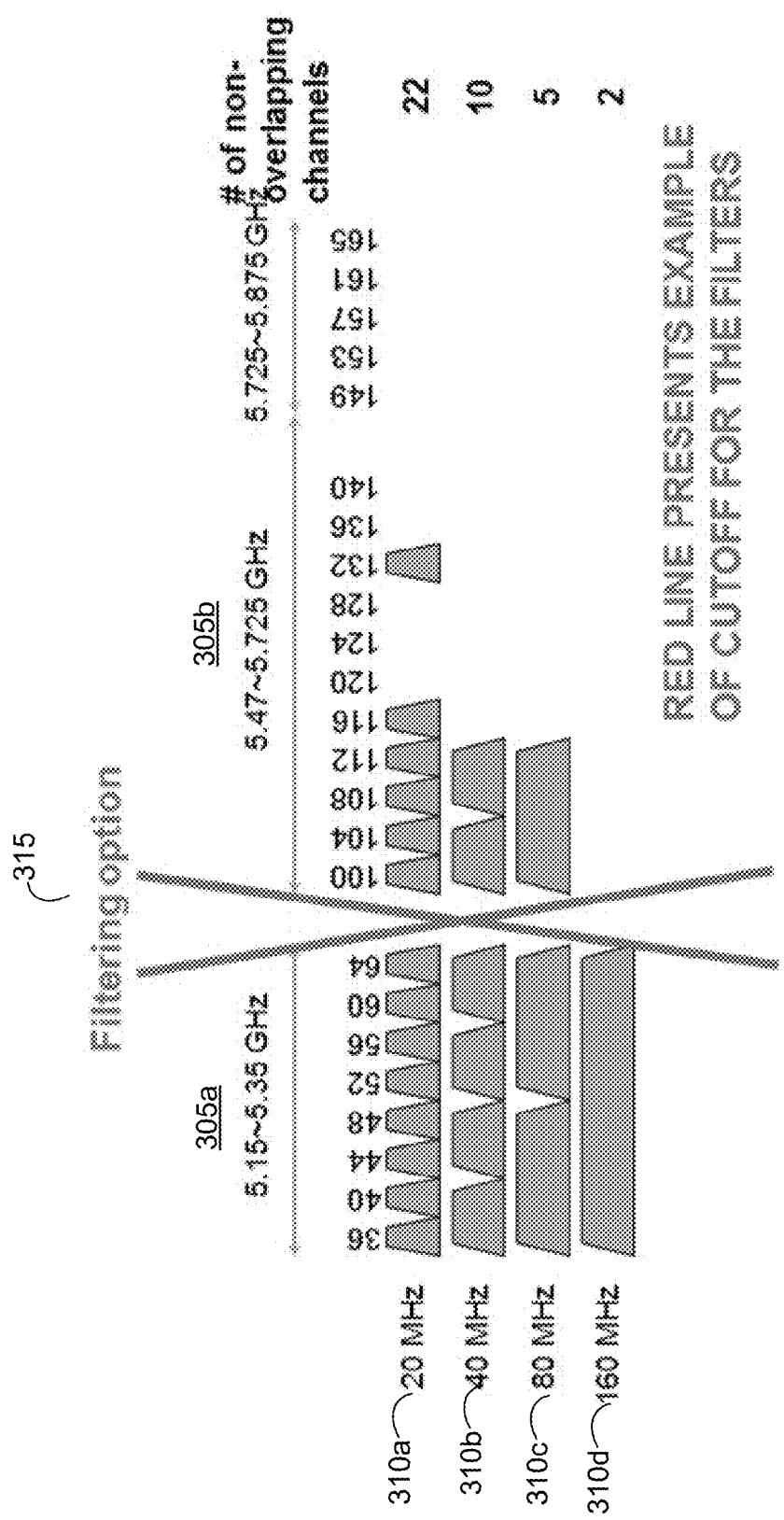
FIG. 3 depicts the filtering options available in the 5 GHz European Union allocation as may occur in some embodiments.

FIG. 3 depicts the filtering options available in the 5 GHz European Union allocation as may occur in some embodiments. The lines 315 present an example cutoff for the filters between the regions 305a and 305b. Additional center frequencies may be available within each region 305a and 305b depending upon the channel bandwidth frequency 310a-d used at, e.g., an 802.11 Access Point.

Figure 4:
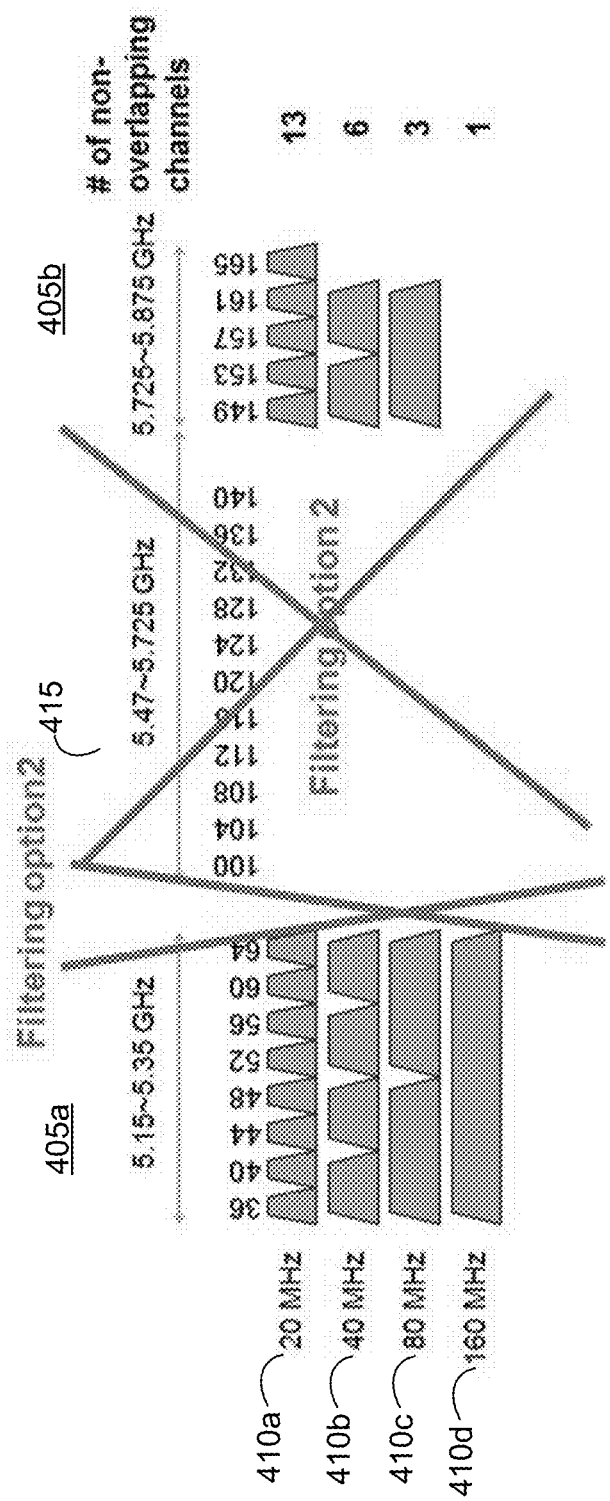
FIG. 4 depicts the filtering options available in the 5 GHz allocation in some countries (e.g., India and Mexico) as may occur in some embodiments.

FIG. 4 depicts the filtering options available in the 5 GHz allocation in some countries (e.g., India and Mexico) as may occur in some embodiments. The lines 415 present an example cutoff for the filters between the regions 405a and 405b. In this example, the cutoff region may focus at one of two filtering options (or both options may be filtered together). Additional center frequencies may be available within each region 405a and 405b depending upon the channel bandwidth frequency 410a-d used at, e.g., an 802.11 Access Point.

Figure 5:
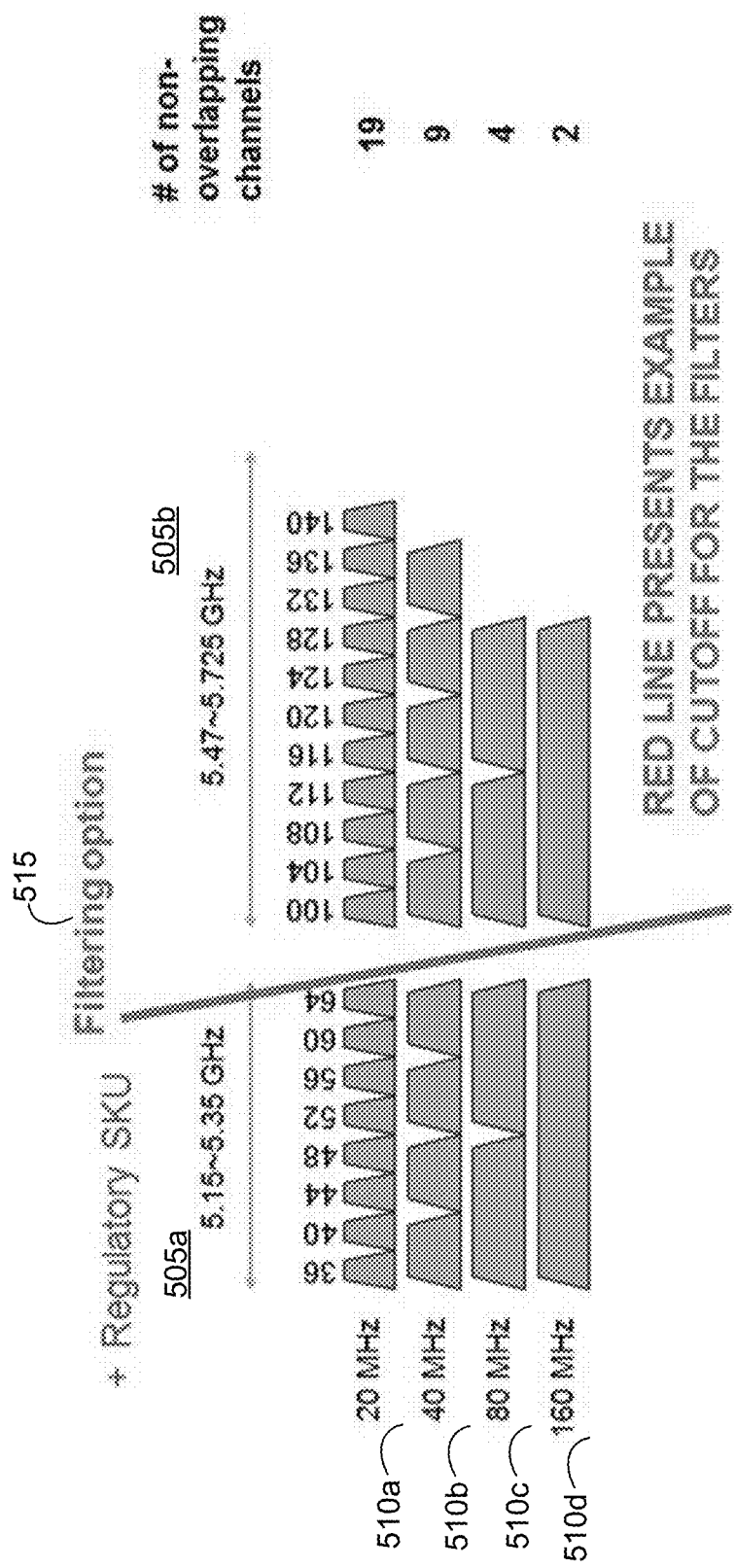
FIG. 5 depicts the filtering options available in the 5 GHz allocation in Japan as may occur in some embodiments.

FIG. 5 depicts the filtering options available in the 5 GHz allocation in Japan as may occur in some embodiments. The lines 515 present an example cutoff for the filters between the regions 505a and 505b. Additional center frequencies may be available within each region 505a and 505b depending upon the channel bandwidth frequency 510a-d used at, e.g., an 802.11 Access Point.

Figure 6:
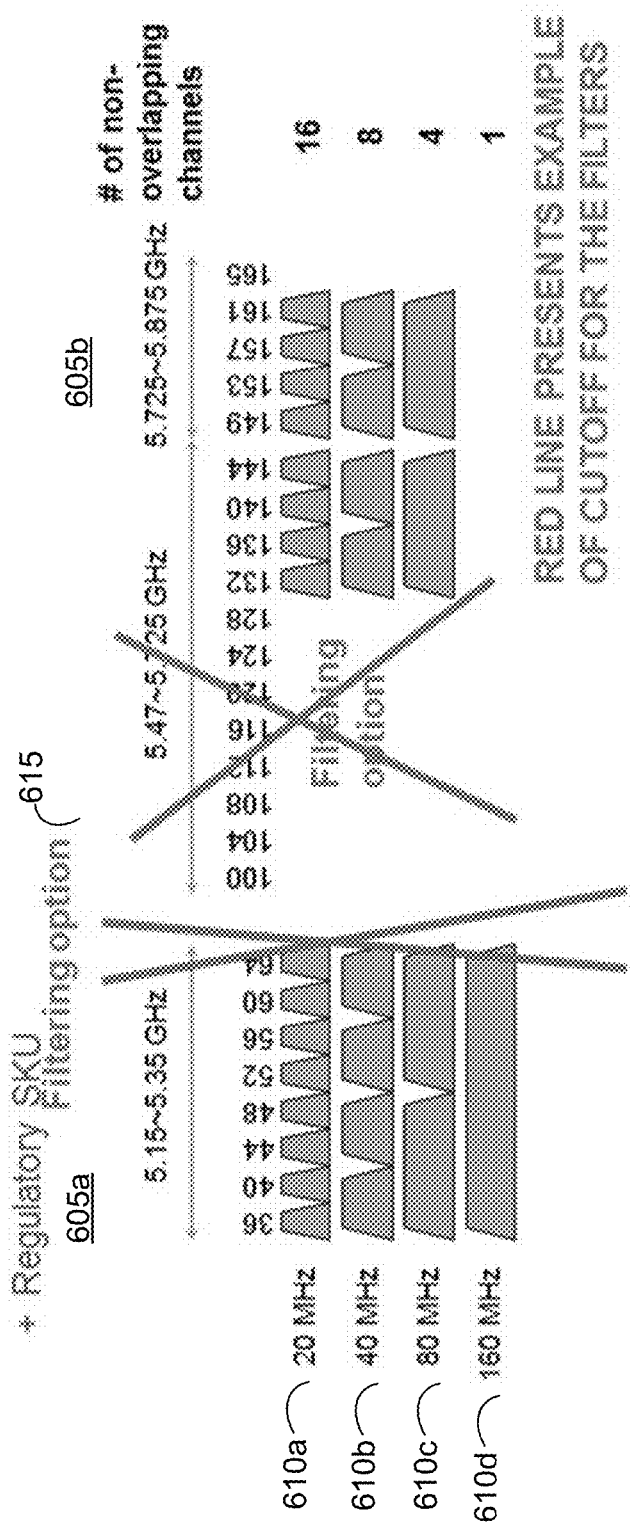
FIG. 6 depicts the filtering options available in the 5 GHz allocation in Russia as may occur in some embodiments.

FIG. 6 depicts the filtering options available in the 5 GHz allocation in Russia as may occur in some embodiments. The lines 615 present an example cutoff for the filters between the regions 605a and 605b. In this example, the cutoff region may focus at one of two filtering options (or both options may be filtered together). Additional center frequencies may be available within each region 605a and 605b depending upon the channel bandwidth frequency 610a-d used at, e.g., an 802.11 Access Point.

Figure 7:
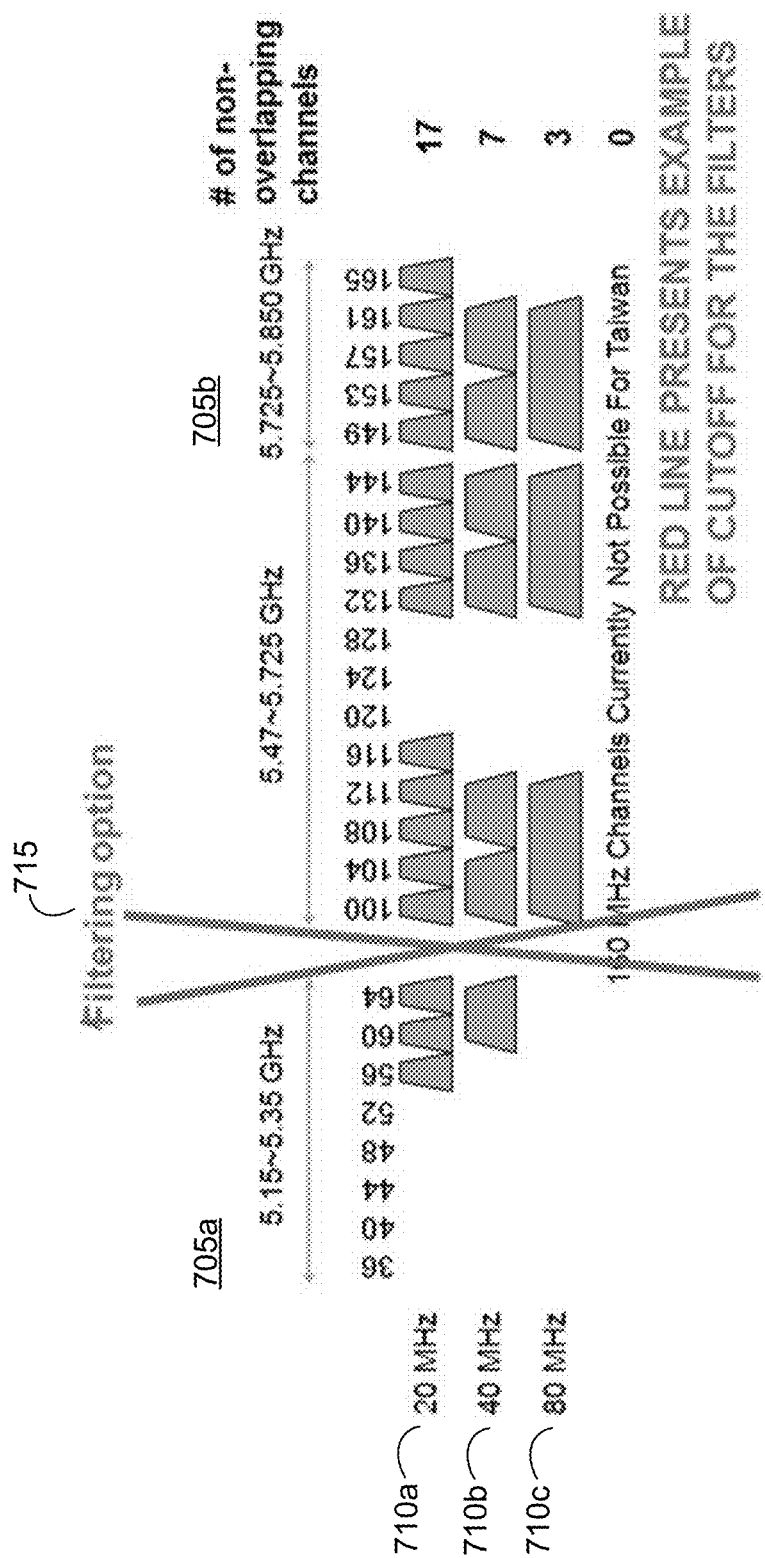
FIG. 7 depicts the filtering options available in the 5 GHz allocation in Brazil and Taiwan as may occur in some embodiments.

FIG. 7 depicts the filtering options available in the 5 GHz allocation in Brazil and Taiwan as may occur in some embodiments. The lines 715 present an example cutoff for the filters between the regions 705a and 705b. Additional center frequencies may be available within each region 705a and 705b depending upon the channel bandwidth frequency 710a-c used at, e.g., an 802.11 Access Point.

Figure 8:
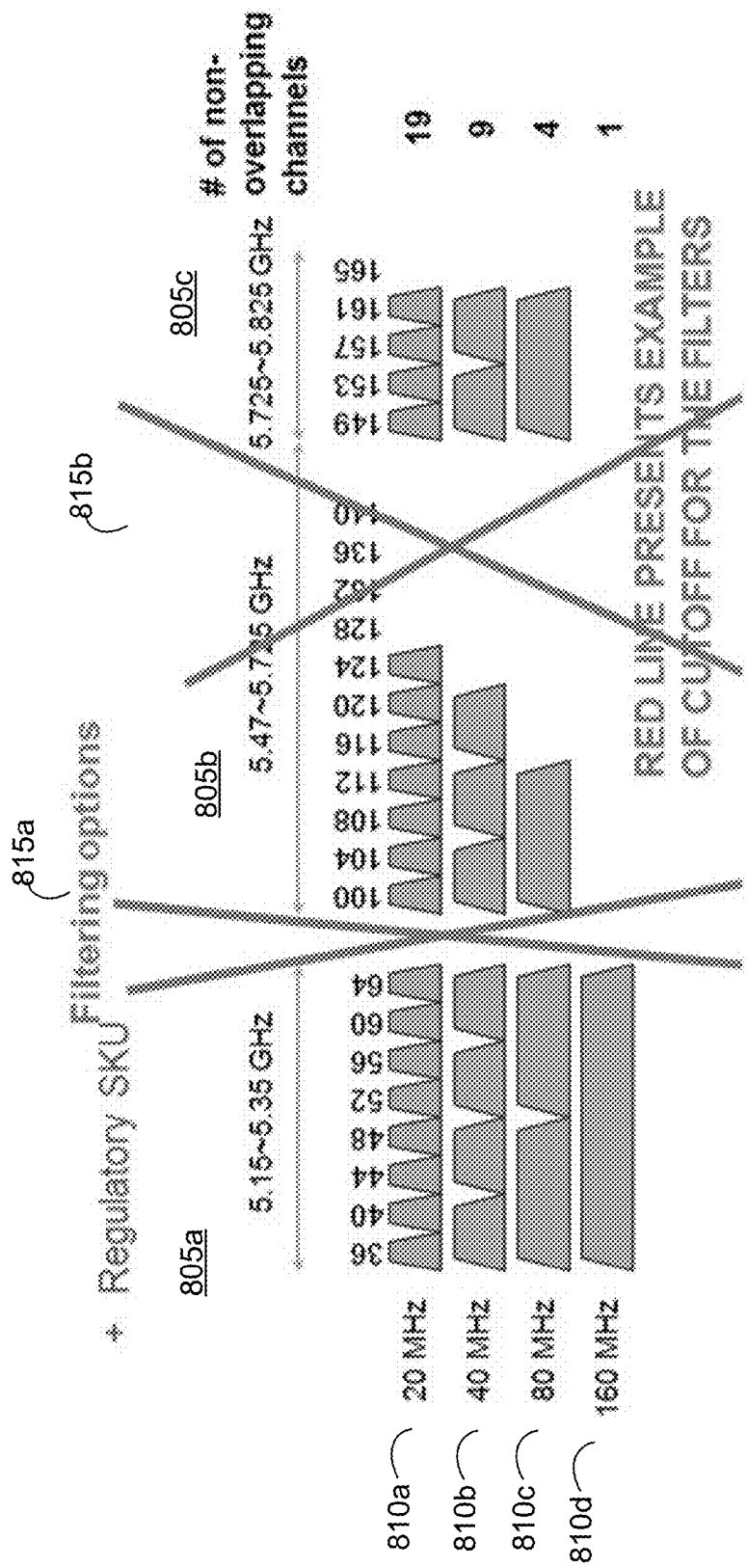
FIG. 8 depicts the filtering options available in the 5 GHz allocation in Korea as may occur in some embodiments.

FIG. 8 depicts the filtering options available in the 5 GHz allocation in Korea as may occur in some embodiments. The lines 815a present example cutoffs for the filters between the regions 805a, 805b, and 805c. Additional center frequencies may be available within each region 805a, 805b, and 805c depending upon the channel bandwidth frequency 810a-c used at, e.g., an 802.11 Access Point.

Example Communication System

Figure 9:
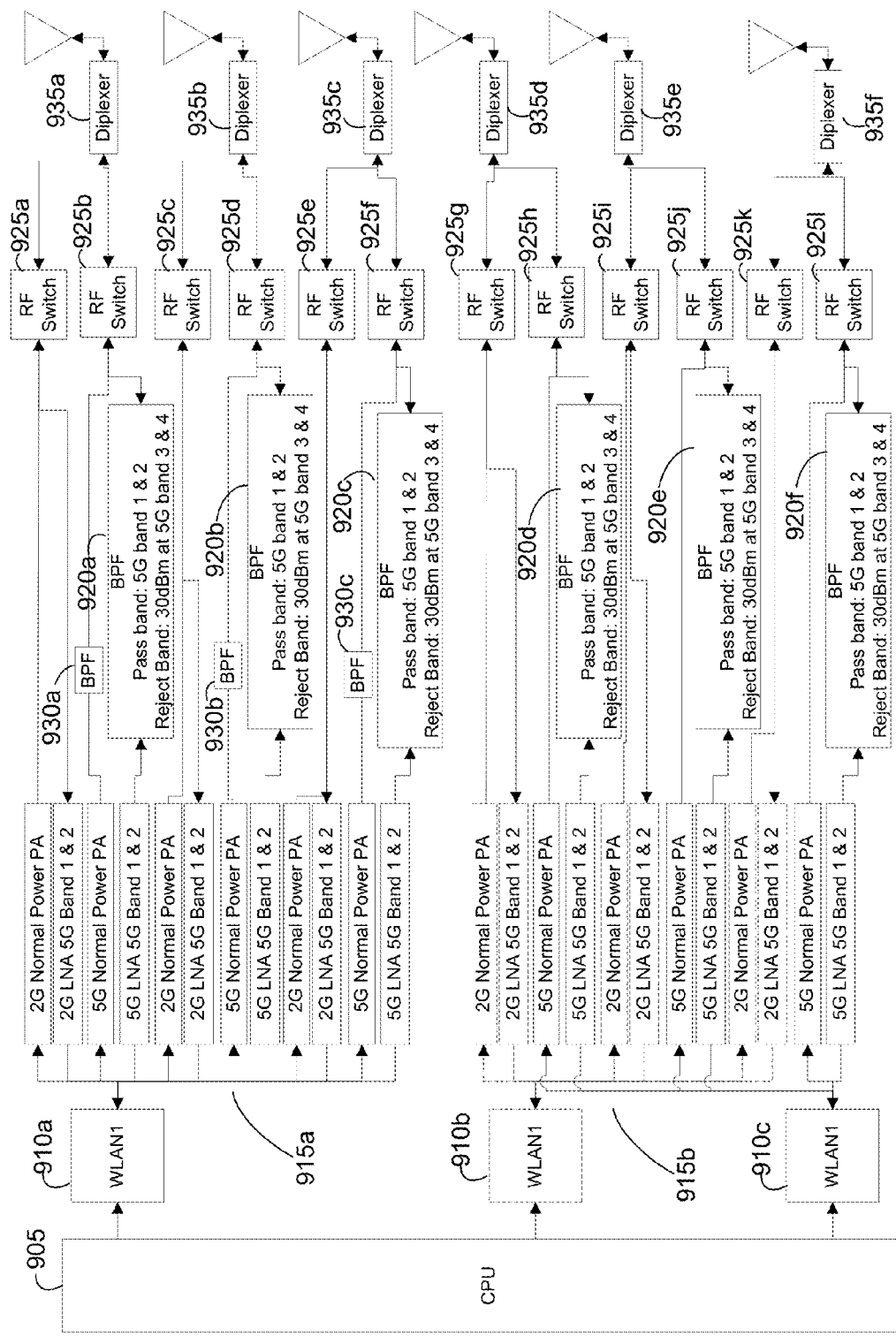
FIG. 9 is block diagram of an example communications system implementing coexistent 5 GHz bands and coexistent 2.4 GHz bands as may be implemented in some embodiments.

FIG. 9 is block diagram of an example communications system implementing coexistent 5 GHz subchannels and coexistent 2.4 GHz subchannels as may be implemented in some embodiments. A central processing unit 905 may be in communication with a plurality of WLAN modules 910a-c. The first WLAN module 910a may be in communication with a plurality 915a of 2.4/5 GHz power amplifiers and 2.4G/5 GHz Low Noise Amplifiers (LNA) for the first and second subchannels (the 2.4 GHz band may be presented by a "2" in the figure for space considerations). The 5 GHz LNA subchannels of the plurality 915a may be connected to a bandpass filter 920a-c before passing to an RF switch 925b, 925d, 925f. Additional BPFs 930a-c may be used to isolate the relevant signal on the receive path (though, as depicted by their absence on some lines, their use may be optional and/or may depend on the design constraints of the situation). The switches 925b, 925d, 925f may provide for time division multiplexing of the antenna usage between the subchannels in conjunction with corresponding switches

925a, 925c, 925e. The signals may pass through a diplexer 935a-c to facilitate use of the antenna by multiple subchannels.

A corresponding arrangement may exist for the WLAN modules 910b, 910c. The connections for the WLAN module 910b are indicated in dashed lines to distinguish from the connections for WLAN module 910c. In this example WLAN module 910b is dedicated to the 2 GHz components while WLAN module 910c is dedicated to the 5 GHz components. As depicted in this example, not only will the 2 GHz subchannels share an antenna, but the 2 GHz and 5 GHz systems may share a single antenna as well, using switches 925g-l and diplexers 935d-f.

Figure 10:
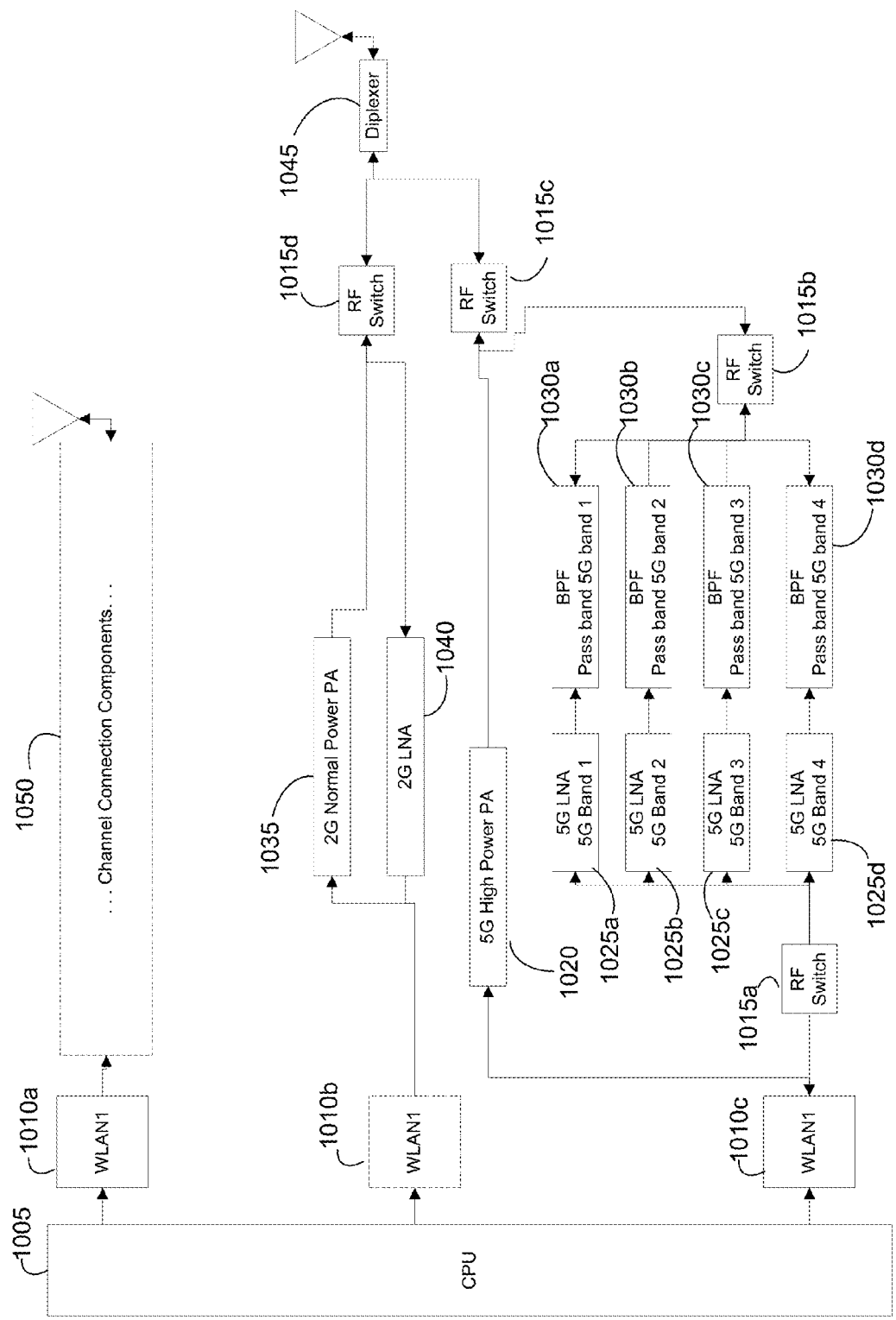
FIG. 10 is block diagram of an example communications system having four separate 5 GHz subchannels I & II & III & IV with an RF switch (e.g. SPXT) as may be implemented in some embodiments.

FIG. 10 is block diagram of an example communications system having four separate 5 GHz subchannels I & II & III & IV with an RF switch (e.g. SPXT) as may be implemented in some embodiments. Again, a central processing unit 1005, may communicate with WLAN modules 1010b-c. Block 1050 indicates that the same or similar component as depicted in FIG. 9 may be present in this embodiment as well for one or more WLAN modules 1010a. WLAN module 1010b may be dedicated to 2 GHz components (e.g., power amplifier 1035 and LNA 1040). In this example, WLAN module 1010c may be able to transmit and receive on four separate subchannels of the 5 GHz region via corresponding LNAs 1025a-d and BPFs 1030a-d. Switch 1015a may be used to switch between the subchannels. WLAN module 1010c may also provide backwards compatible communication via the 5 GHz PA 1020. Switches 1015b, 1015c, and 1015d may cooperate to facilitate time division multiplexing of a single antenna (though multiple antennas may be used for each subchannel in some embodiments).

In some embodiments, an LNA with rejection may be used for each subchannel to ease the filtering requirement (e.g., the LNA may perform part of the rejection so that the filter need perform less of the overall rejection). In some embodiments, linear power amplification may be used to amplify the signal on the one or more 5 GHz subchannels. In some embodiments, wide band and linear LNAs may be used to amplify the signal on both 5 GHz subchannels. In a flexible structure where each chipset can work on several subchannel options, single pole double throw (SPDT), single pole triple throw, and/or single pole X throw (SPXT) may be used for the front end of each chipset such that 2, 3, or N frontend options are available for each chipset.

In some embodiments, the control line for SPXT may be in communication with the processor while LNA/PA/T/r may be provided from the WLAN switch. In some embodiments, where the Automatic Gain Control (AGC) adjusts the gain for reception, the radio transmit gain control may control the common power amplifier gain. In some embodiments, the system may employ one common LNA, one common PA and a BPF.

Link Aggregation

Figure 11:
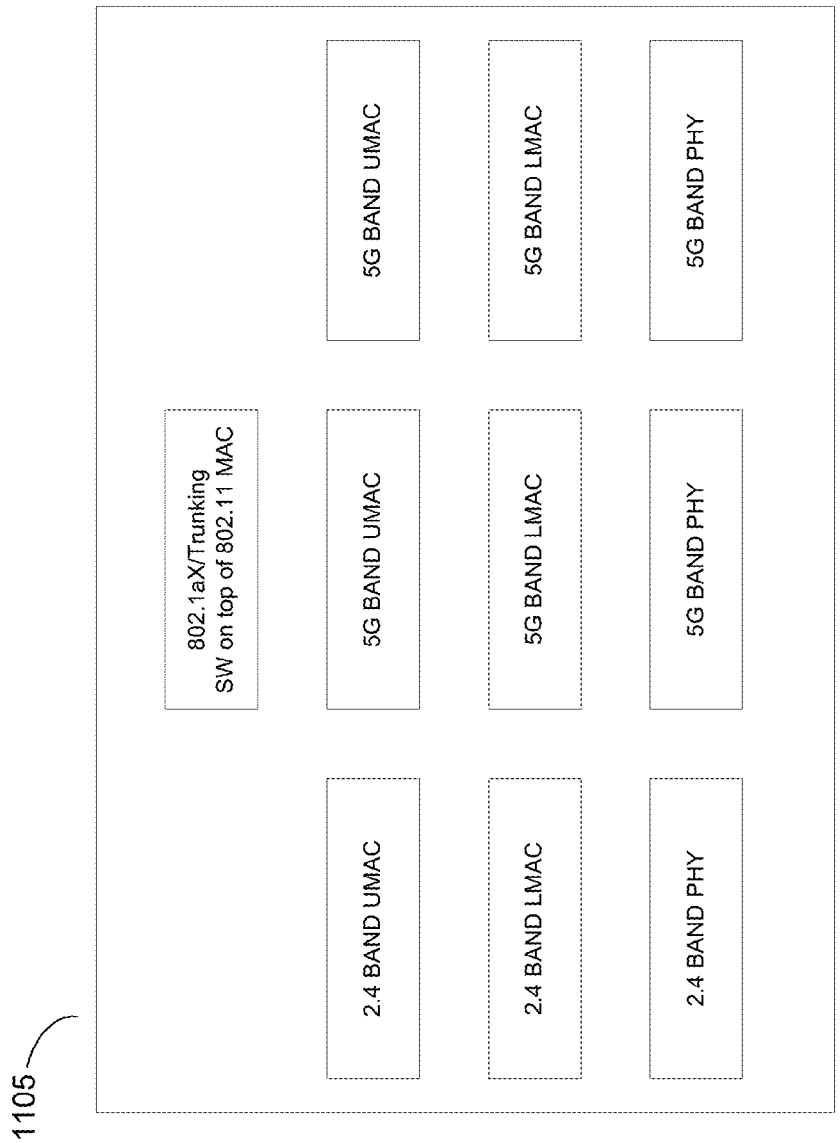
FIG. 11 is block diagram of an example link aggregation implementing 802.1aX/Trunking as may occur in some embodiments.

FIG. 11 is block diagram of an example link aggregation 802.1X/Trunking as may be implemented in some embodiments. The software module may include an 802.1aX trunking software component 1105, 5 GHz LMACs, 5 GHz UMACs, 2.4 GHZ UMACS, and corresponding physical layer components for each for the 2.4 and 5 GHz components. In some embodiments, R8000 802.11 link aggregation may occur at layer 2 or higher such that multiple radios are efficiently used in higher layers of the network or application layer. In some embodiments a Multiple Radio AP may be the gateway in a home. The AP may employ 2.4G support to sensors using 2.4 GHz Fast Channel Switch. Alternatively, in some embodiments a coexistence bus may be used with two chipsets in 2.4 GHz and one chipset in 5 GHz.

WLAN Client Module

Figure 12:
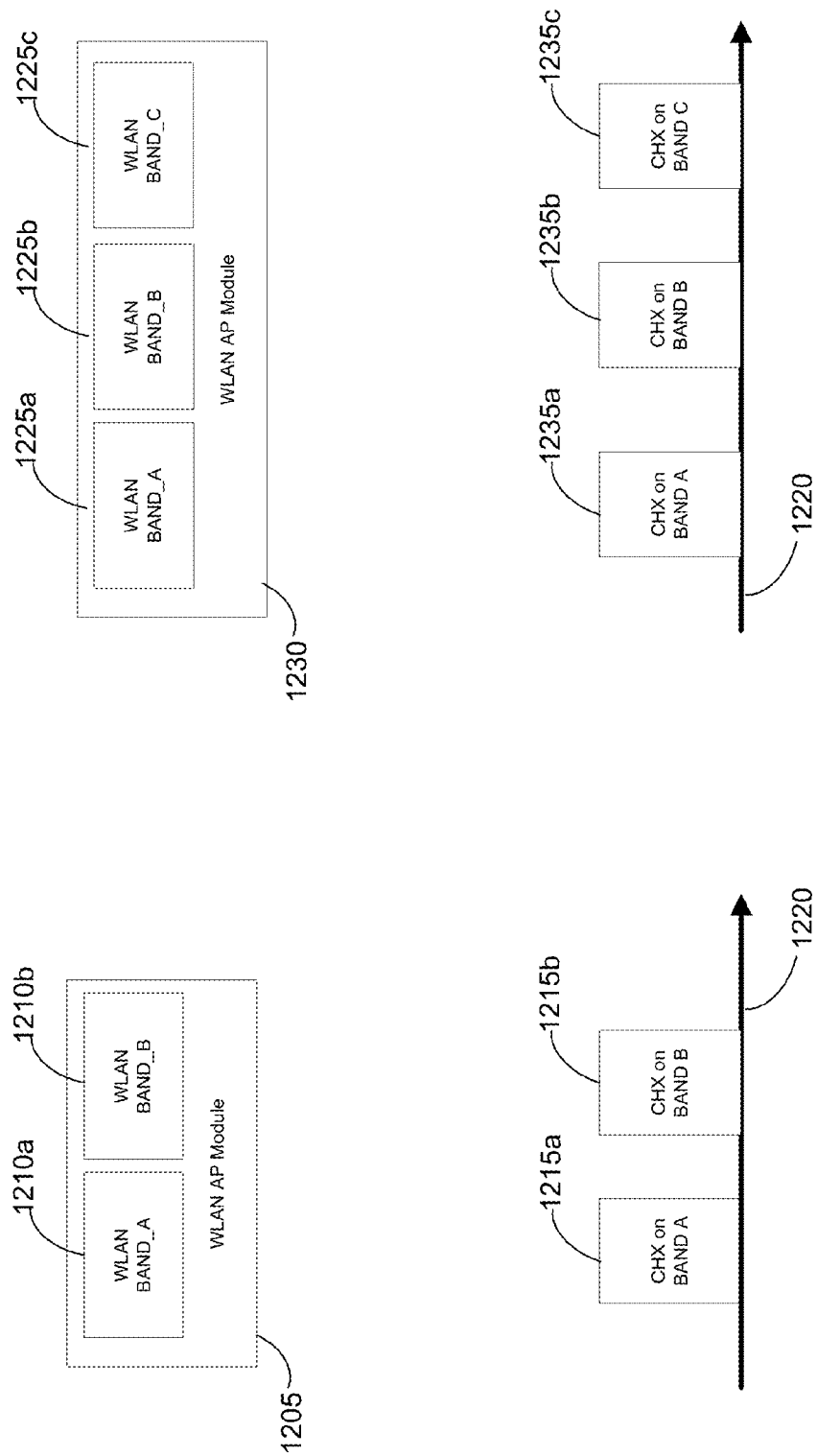
FIG. 12 is block diagram of example WLAN modules as may be implemented in some embodiments.

FIG. 12 is block diagram of an example WLAN client module as may be implemented in some embodiments. In AP module 1205 filter modules 1210a-b may communicate across corresponding subchannels 1215a-b along frequency 1220 within the 5 GHz region. In some regions (e.g., regions in FIG. 8), or where a channel bandwidth frequency is selected to facilitate additional overlapping subchannels, more than two subchannels may be possible. Accordingly, in device 1230, filters 1225a-c selectively facilitate communication on subchannels 1235a-c. Though three subchannels are depicted here for purposes of explanation, more than three subchannels may be used as discussed in greater detail herein. AP modules 1205, 1220 may serve as gateways or routers. In some embodiments, the modules may be USB, Firewire, or Bluetooth peripherals. As discussed above, AP modules 1205, 1220 may have one or more antennas for communicating on the subchannels (e.g., a single antenna may be used for all three subchannels).

Figure 13:
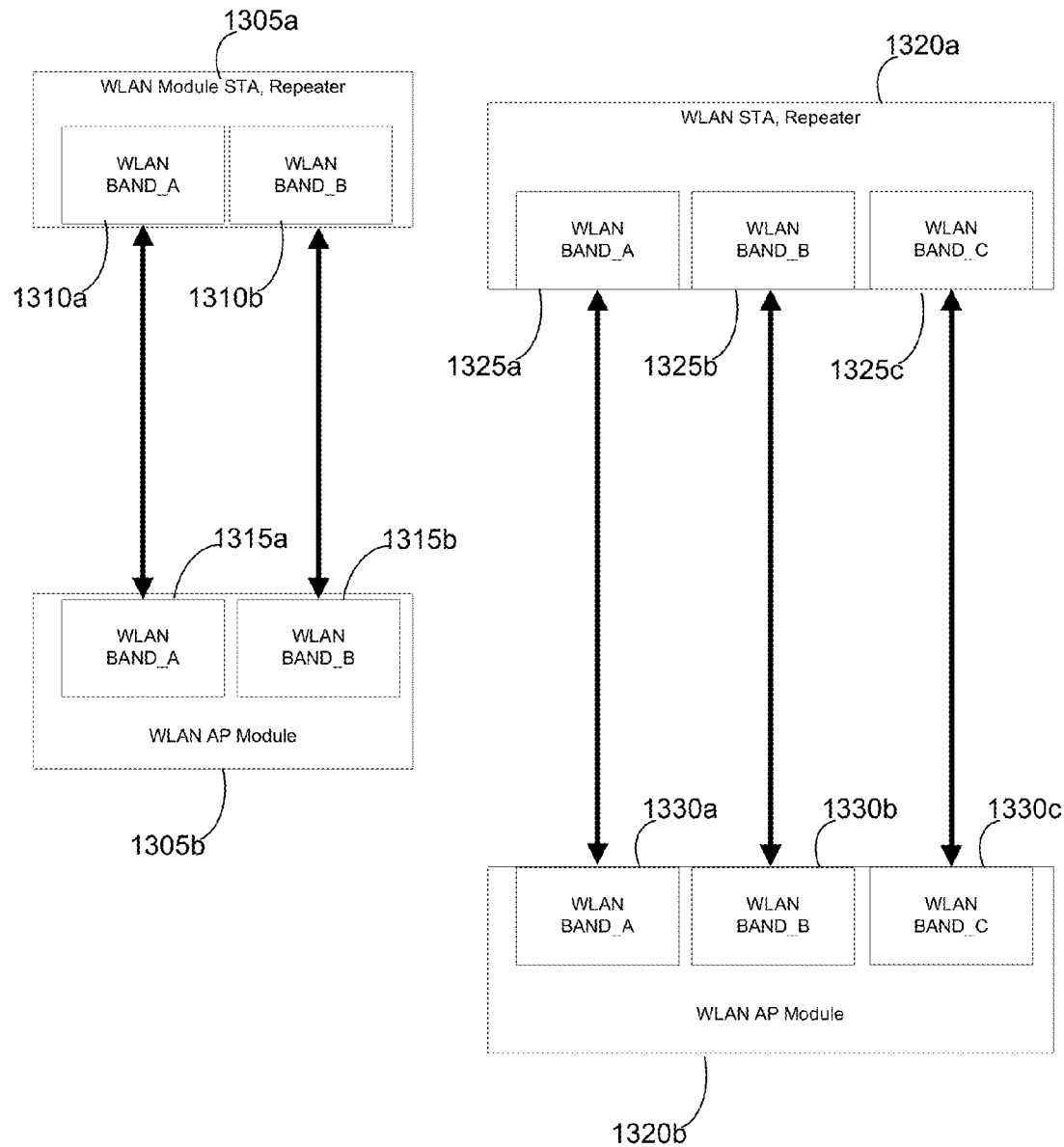
FIG. 13 is block diagram of example operational modes for aggregation as may be implemented in some embodiments.

FIG. 13 is block diagram of example operational modes for aggregation as may be implemented in some embodiments. In some embodiments, the AP may communicate to another device that supports simultaneous multi subchannel activity on all or a subset of the supported subchannels. The other device may be, e.g., a bridge, extender, STA, a simultaneous multi subchannel router, etc. In this example, a first two-subchannel device 1305a communicates with a second two-subchannel device 1305b. The first two-subchannel device 1305a employs filters 1310a-b to select the respective subchannels while the second two-subchannel device 1305b applies corresponding filters 1315a-b. A corresponding implementation for three or more subchannels, as depicted for devices 1320a-b may be possible using filters 1325a-c and 1330a-c.

Figure 14:
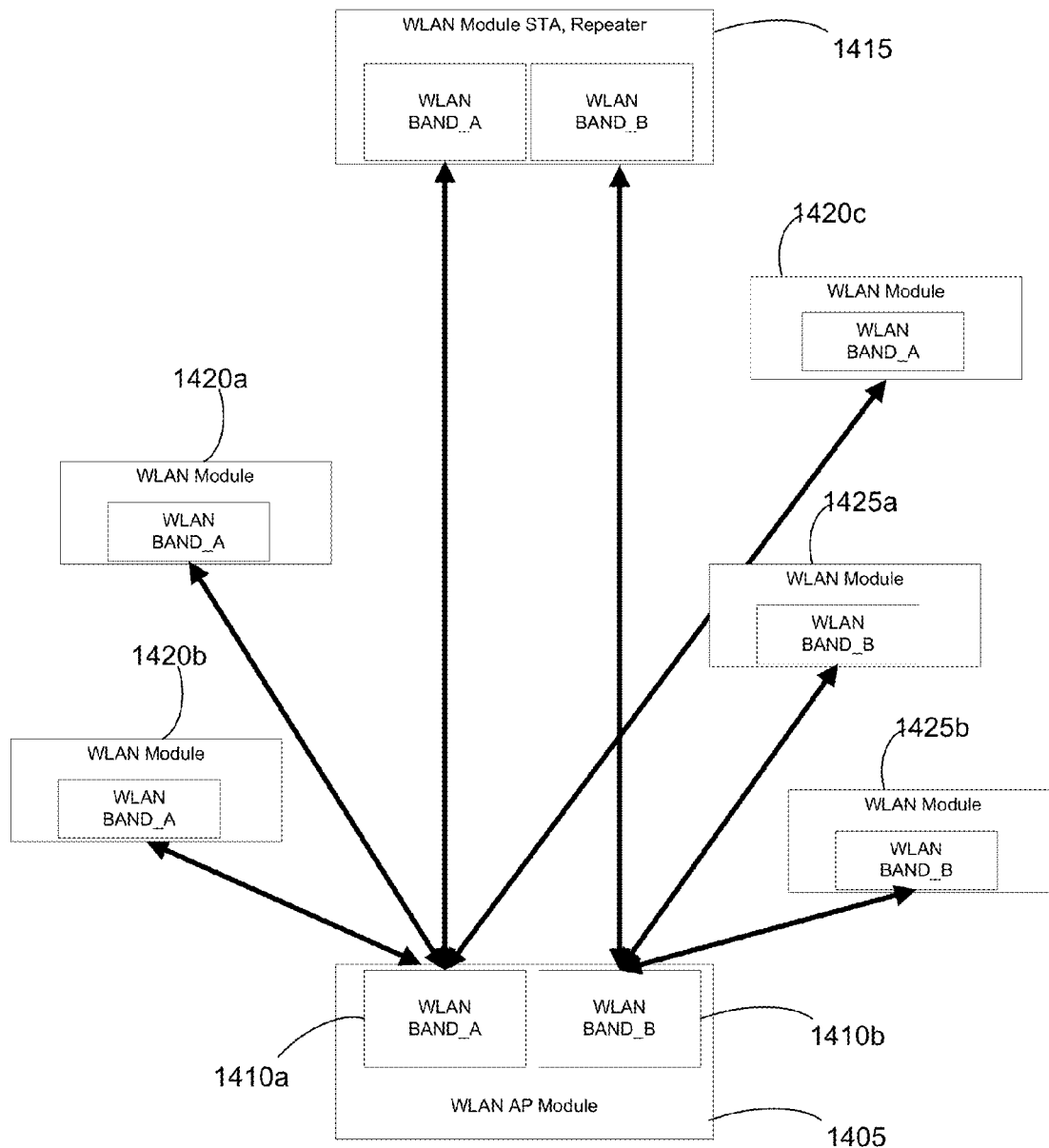
FIG. 14 is block diagram of additional example operational modes for aggregation as may be implemented in some embodiments.

FIG. 14 is block diagram of additional example operational modes for aggregation as may be implemented in some embodiments. In this example, an AP module 1405, may use two or more subchannels 1410a-b, to communicate with another station 1415 that can support two or more subchannels simultaneously or a repeater. The AP module 1405 may use filter 1410a to communicate on the first subchannel with devices 1420a-c, and the second filter 1410b to communicate on the second subchannel with devices 1425a-b (e.g., via time division multiplexing). In some embodiments the various modules may be a USB, Firewire or similar peripheral as discussed herein.

Figure 15:
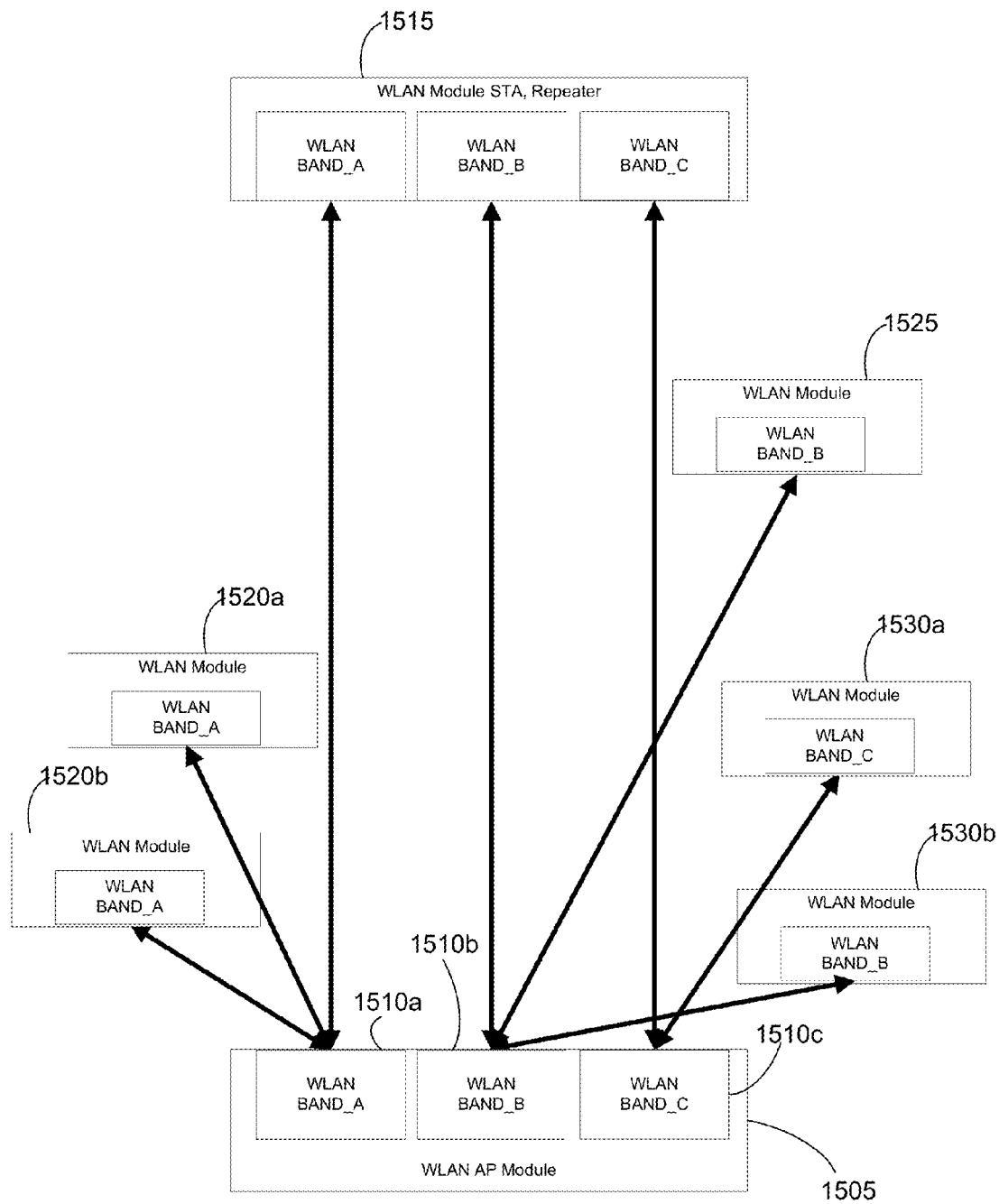
FIG. 15 is block diagram of additional example operational modes for aggregation as may be implemented in some embodiments.

FIG. 15 is block diagram of additional example operational modes for aggregation as may be implemented in some embodiments. In this example, three or more filters 1510a-c are used at an access point 1505. The filters 1510a-c may be used to communicate via corresponding filters with device station/repeater 1515. Access point 1505 can also communicate with individual devices 1520a-b on the first subchannel, device 1525 on the second subchannel, and devices 1530a-b on the third subchannel. In some embodiments the various modules may be a USB, Firewire or similar peripheral as discussed herein.

During some period of time, e.g., where there is traffic between the AP and another device supporting simultaneous multi subchannel activity, the AP may communicate to the other device. In some embodiments, the medium accessing mechanism for each subchannel may follow the EDCA procedure of 802.11 for each subchannel. During another period of time, the AP may talk to several devices that can be active on only one subchannel at a time.

WiFi Ethernet Extension

In some embodiments, Layer 2 link aggregation defined for Ethernet may be extended for WLAN. Port trunking, link bundling, Ethernet/network/NIC bonding, or NIC teaming for Layer 2 aggregation may be applied to subchannel support. These umbrella terms not only encompass vendor-independent standards such as Link Aggregation Control Protocol (LACP) for Ethernet defined in IEEE 802.1ax or the previous IEEE 802.3ad, but also various proprietary solutions that have been deployed for bundling different Ethernet connections. In some embodiments, the disclosed methods can be extended to support two or more WiFi networks that are used on an access point, repeater, or extender module to support multiple subchannels within the 2.4 or 5 GHz bands.

Multipath TCP

Figure 16:
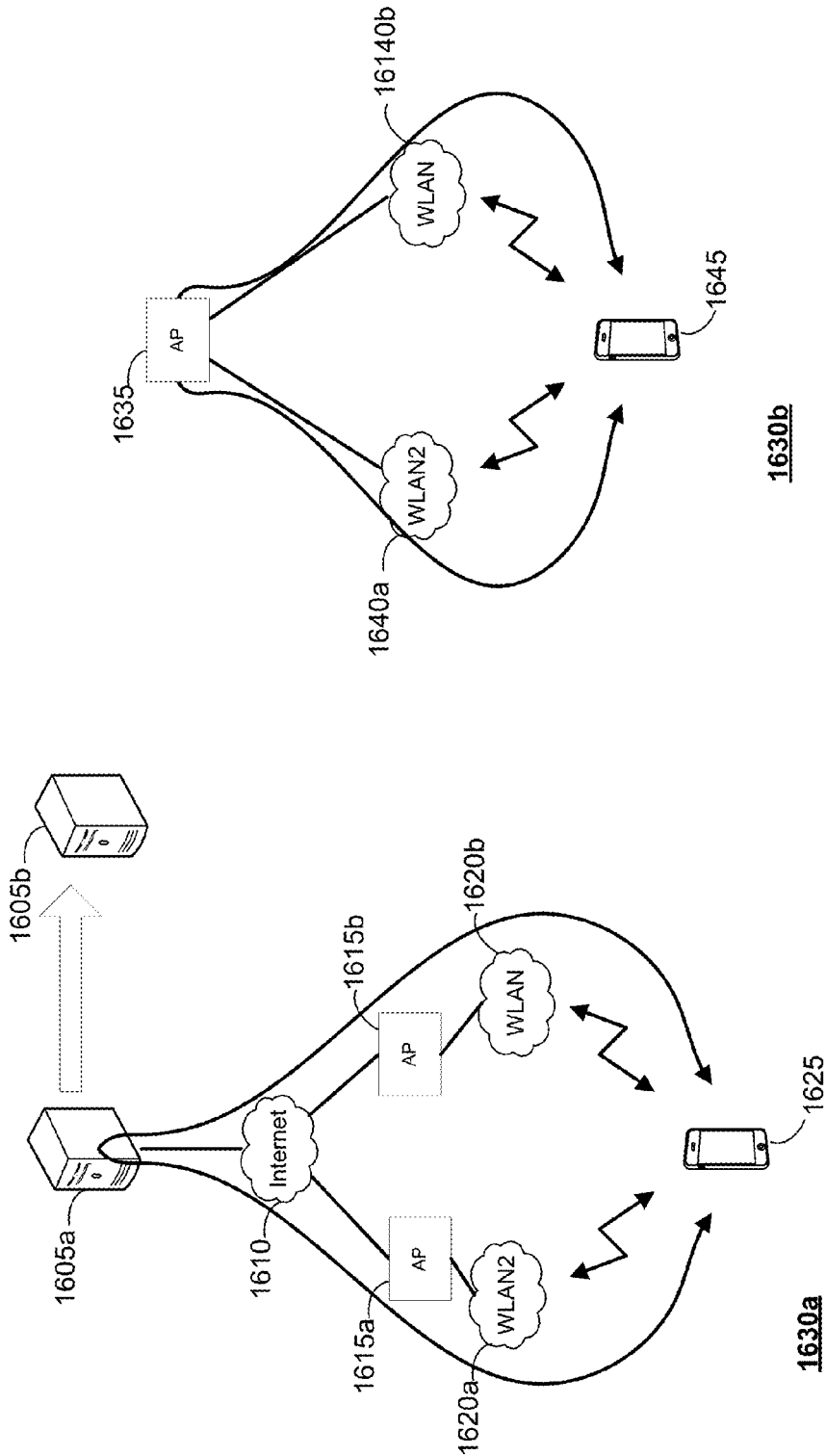
FIG. 16 is block diagram of a multipath TCP (MTCP) use case as may be implemented in some embodiments.

FIG. 16 is block diagram of a multipath TCP (MTCP) use case as may be implemented in some embodiments. In situation 1630a, use of multiple 5 GHz subchannels may allow user device 1625 to communicate across two wireless local area networks 1620a-b simultaneously to reach the internet 1610 via access points 1615a, 1615b (e.g. access point 1615a may operate on a first subchannel and access point 1615b on a second). These communications may reach a server 1605a which may handle the communications or forward the data to another server 1605b. For example, sever 1605a may be deployed in the cloud and a wireless client may connect over various wireless links through one or more APs 1615a-b to the server 1605a. The server 1605a may combine the MTCP into one TCP session and send the combined TCP session out to another sever 1605b which may not support MTCP. In some embodiments the MTCP may combine the traffic of one or more 5 GHz modules with a 2.4 GHz module or any other form of network connection.

In situation 1630b, the user device 1645 may stay locally connected via two local networks 1640a-b but with a single access point 1635 able to communicate on both subchannels.

Aggregation via multipath TCP may provide several benefits, including: improved download time, improved round trip time (RTT), increased resilience, better loss rate, etc. In some embodiments, MTCP presents the same user interface as TCP. MTCP may modify TCP so that it presents a standard TCP interface to applications, while in fact spreading data across several subflows. Once an MPTCP connection is initiated and the first flow is established, each end host may discover one of its peer's IP addresses. When the client has an additional interface, for example, a second WLAN subchannel, the additional interface may be used to first notify the server of its additional IP address with an "Add Address" option over the established subflow. The additional interface may then send another SYN packet with a JOIN option to the server's known IP address. With this MTCP-JOIN option, this subflow may then be associated with a previously established MTCP connection over WLAN.

Using MTCP may provide several advantages over application layer aggregation. For example, MTCP may leverage the TCP handshake to bootstrap subflows quickly. MTCP may be used for all existing TCP applications, although this advantage holds for layer 2 aggregation as well.

Network Address Translation (NAT) may present problems. For example, when the server has an additional interface it may be difficult for the server to directly communicate with the WLAN client as the NATs may filter out unidentified packets. To overcome these limitations, in some embodiments the server may send an "Add Address" option on the established subflow, notifying the client of its additional interface. Once the client receives the option, the client sends out another SYN packet with a "JOIN" option to the server's newly notified IP address, together with the exchanged hashed key for this MTCP connection. The client may then initiate a new subflow.

Certain embodiments further address congestion control. Each MTCP subflow may behave as a legacy TCP flow except for the congestion control algorithms. Accordingly, after the 3-way handshake, each subflow may maintain its own congestion window and retransmission scheme during data transfer. This may begin with a slow-start phase that doubles the window per RTT before entering the congestion avoidance phase.

In some embodiments, MTCP can be used between a client supporting multi-channel/multi subchannel support and an AP modified as discussed above to aggregate the TPUT over several wireless link. The AP may combine different TCP streams of MTCP into one TCP connection if needed. If a wireless user is downloading a file from a hard disk that is connected to the AP, the MTCP connection can be used to download the file faster from the hard disk. If there is a media application like voice for video the MTCP link may be used to minimize the delay and packet loss. MTCP may also be used to create a connection that is more robust to interference. For example, if one subchannel has interference or another issue, MTCP can push the traffic onto the other subchannel.

Load Balancing

Figure 17:
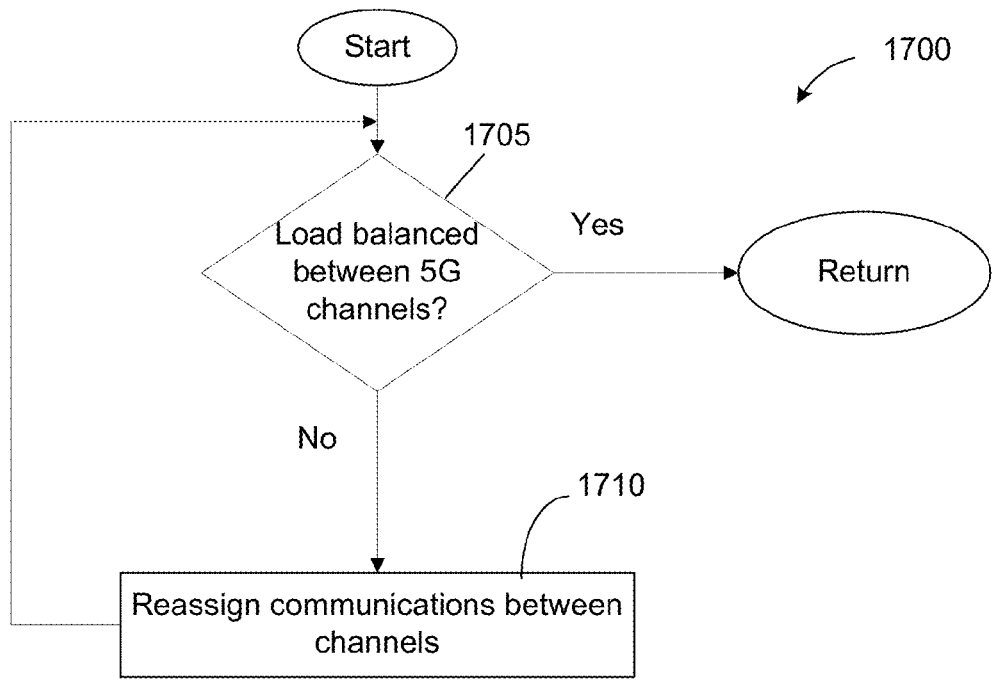
FIG. 17 is a flow diagram depicting a process for balancing a load between two coexistent 5 GHz subchannels as may be implemented in some embodiments.

FIG. 17 is a flow diagram depicting a process for balancing a load between two coexistent 5 GHz subchannels as may be implemented in some embodiments. At block 1705 the system may determine whether the load is adequately balanced between the subchannels. For example, a VOIP application may be exclusively transmitting on a first subchannel while the second subchannel remains relatively unused. Having determined that the current allocation is suboptimal, at block 1710 the system may assign a portion of the VOIP communication to the second subchannel. For example, in some applications video may be transmitted on one subchannel and the corresponding audio may be transmitted on a second subchannel. In some embodiments, the load may be balanced between subchannels based on a plurality of factors, e.g., the number of users, the data rate on each subchannel (or combined), airtime, features in an IEEE standard, etc.

Computer System

FIG. 18 is a block diagram of a computer system as may be used to implement features of some of the embodiments. The computing system 1800 may include one or more central processing units ("processors") 1805, memory 1810, input/output devices 1825 (e.g., keyboard and pointing devices, display devices), storage devices 1820 (e.g., disk drives), and network adapters 1830 (e.g., network interfaces) that are connected to an interconnect 1815. The interconnect 1815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1810 and storage devices 1820 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 1810 can be implemented as software and/or firmware to program the processor(s) 1805 to carry out actions described above. In some embodiments, such software or firmware may be initially provided to the processing system 1800 by downloading it from a remote system through the computing system 1800 (e.g., via network adapter 1830).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The invention claimed is:

1. A computer-implemented method comprising:
    associating a first communication subchannel with a first bandwidth region;
    associating a second communication subchannel with a second bandwidth region;
    transmitting and receiving a first dataset associated with the first communication subchannel in the first bandwidth region;
    transmitting and receiving a second dataset associated with the second communication subchannel in the second bandwidth region;
    assessing a load imposed on the first communication subchannel and the second communication subchannel; and
    reassigning at least a portion of the first communication subchannel based on the assessment of the load;
    wherein the first bandwidth region and the second bandwidth region are receivable by a WLAN device operating in approximately the 5 GHz bandwidth region; and
    wherein the first bandwidth region and the second bandwidth regions are non-overlapping subdivisions of the 5 GHz bandwidth region encompassing one or more center frequencies and separated by a cutoff region.

2. The computer-implemented method of claim 1, wherein signals received by the WLAN device that are at frequencies in the cutoff region are excluded before being amplified.

3. The computer-implemented method of claim 1, further comprising:
    applying a bandpass filter (BPF) to at least a portion of the first dataset and the second dataset.

4. The computer-implemented method of claim 3, wherein the BPF is configured to filter the first and second subchannel bands and is configured to reject, at least in part, a band above 5400 MHz.

5. The computer-implemented method of claim 1, wherein the first subchannel includes a region between 5170 and 5330 MHz and the second subchannel includes a region between 5490 MHz and 5835 MHz.

6. A non-transitory computer-readable medium comprising
    instructions executable by at least one processor to perform a method comprising:
    associating a first communication subchannel with a first bandwidth region;
    associating a second communication subchannel with a second bandwidth region;

transmitting and receiving a first dataset associated with the first communication subchannel in the first bandwidth region;

transmitting and receiving a second dataset associated with the second communication subchannel in the second bandwidth region;

assessing a load imposed on the first communication subchannel and the second communication subchannel; and reassigning at least a portion of the first communication subchannel based on the assessment of the load;

wherein the first bandwidth region and the second bandwidth region are receivable by a WLAN device operating in approximately the 5 GHz bandwidth region; and wherein the first bandwidth region and the second bandwidth regions are non-overlapping subdivisions of the 5 GHz bandwidth region encompassing one or more center frequencies and separated by a cutoff region.

7. The non-transitory computer-readable medium of claim 6, wherein signals received by the WLAN device that are at frequencies in the cutoff region are excluded before being amplified.

8. The non-transitory computer-readable medium of claim 6 wherein the instructions are executable by the at least one processor to perform a method further comprising:

applying a bandpass filter (BPF) to at least a portion of the first dataset and the second dataset.

9. The non-transitory computer-readable medium of claim 8, wherein the BPF is configured to filter the first and second subchannel bands and is configured to reject, at least in part, a band above 5400 MHz.

10. The non-transitory computer-readable medium of claim 6, wherein the first subchannel includes a region between 5170 and 5330 MHz and the second subchannel includes a region between 5490 MHz and 58385 MHz.

11. The non-transitory computer-readable medium of claim 6, wherein the non-transitory computer-readable medium is in communication with one of a USB or Firewire peripheral.

12. A system comprising:
one or more processors;
a memory unit having instructions stored thereon, which when executed by the one or more processors cause the system to:
associate a first communication subchannel with a first bandwidth region;
associate a second communication subchannel with a second bandwidth region;
transmit and receive a first dataset associated with the first communication subchannel in the first bandwidth region;
transmit and receive a second dataset associated with the second communication subchannel in the second bandwidth region;
assess a load imposed on the first communication subchannel and the second communication subchannel; and
reassign at least a portion of the first communication subchannel based on the assessment of the load;
wherein the first bandwidth region and the second bandwidth region are receivable by a WLAN device operating in approximately the 5 GHz bandwidth region; and
wherein the first bandwidth region and the second bandwidth regions are non-overlapping subdivisions of the 5 GHz bandwidth region encompassing one or more center frequencies and separated by a cutoff region.

13. The system of claim 12, wherein signals received by the WLAN device that are at frequencies in the cutoff region are excluded before being amplified.

14. The system of claim 12, wherein the memory unit has further instructions stored thereon, which when executed by the one or more processors cause the system to further:

apply a bandpass filter (BPF) to at least a portion of the first dataset and the second dataset.

15. The system of claim 14, wherein the BPF is configured to filter the first and second subchannel bands and is configured to reject, at least in part, a band above 5400 MHz.

16. The system of claim 12, wherein the first subchannel includes a region between 5170 and 5330 MHz and the second subchannel includes a region between 5490 MHz and 5835 MHz.

* * * * *